United States Patent
Pearson et al.

(10) Patent No.: US 10,399,082 B1
(45) Date of Patent: Sep. 3, 2019

(54) ROLL ADJUSTMENT SYSTEM

(71) Applicants: Alex Pearson, Sioux Falls, SD (US);
Blake Sandnes, Sioux Falls, SD (US);
Larry Rossow, Sioux Falls, SD (US);
Nick Hansen, Sioux Falls, SD (US);
Roy Olson, Sioux Falls, SD (US)

(72) Inventors: Alex Pearson, Sioux Falls, SD (US);
Blake Sandnes, Sioux Falls, SD (US);
Larry Rossow, Sioux Falls, SD (US);
Nick Hansen, Sioux Falls, SD (US);
Roy Olson, Sioux Falls, SD (US)

( * ) Notice: Subject to any disclaimer, the term of this patent is extended or adjusted under 35 U.S.C. 154(b) by 230 days.

(21) Appl. No.: 15/399,398

(22) Filed: Jan. 5, 2017

Related U.S. Application Data

(63) Continuation-in-part of application No. 15/225,441, filed on Aug. 1, 2016, now Pat. No. 9,919,315, which is a continuation-in-part of application No. 14/821,936, filed on Aug. 10, 2015.

(51) Int. Cl.
*B02C 4/32* (2006.01)
*B02C 4/38* (2006.01)
*G01B 7/14* (2006.01)

(52) U.S. Cl.
CPC .................. *B02C 4/32* (2013.01); *B02C 4/38* (2013.01); *G01B 7/14* (2013.01)

(58) Field of Classification Search
CPC .............. G01B 7/14; B02C 4/32; B02C 4/38
USPC .................................... 324/72–72.5
See application file for complete search history.

(56) References Cited

U.S. PATENT DOCUMENTS

| | | | |
|---|---|---|---|
| 4,468,265 A * | 8/1984 | MacLaughlin | B29C 65/0672 156/64 |
| 5,533,371 A | 7/1996 | Frischknecht | |
| 6,176,683 B1 * | 1/2001 | Yang | F04B 35/045 417/44.1 |
| 7,832,241 B2 | 11/2010 | Mantovan | |
| 8,206,061 B1 | 6/2012 | Hansen | |
| 8,485,052 B2 | 7/2013 | Gebhart | |
| 8,734,143 B2 | 5/2014 | Morris | |
| 9,919,315 B2 * | 3/2018 | Pearson | B02C 4/32 |
| 2002/0168911 A1 | 11/2002 | Tonner | |
| 2010/0030926 A1 | 2/2010 | Roussy | |

(Continued)

FOREIGN PATENT DOCUMENTS

WO 2005119089 12/2005
WO 2007066847 6/2007

*Primary Examiner* — Jeff W Natalini
(74) *Attorney, Agent, or Firm* — Jeffrey A. Proehl; Woods, Fuller, Shultz & Smith, PC

(57) ABSTRACT

A system may comprise a frame, a pair of rolls with each of the rolls comprising a roll body having opposite ends and a circumferential surface, a plurality of teeth being formed on the circumferential surface, and at least a portion of the circumferential surface being electrically conductive. The roll may also have a roll shaft having end portions extending from the roll body, with each of the end portions extending from one of the ends of the roll body. The system may also comprise roll supports configured to support the rolls on the frame in a manner such that at least one of the rolls is movable to adjust a separation gap between the rolls, a detection apparatus configured to detect contact between the rolls, and a signaling apparatus configured to produce a signal indicating a change in electrical potential is detected by the detection apparatus.

10 Claims, 16 Drawing Sheets

(56) References Cited

U.S. PATENT DOCUMENTS

2013/0271110 A1 10/2013 Yamanaka
2014/0145018 A1 5/2014 Niklewski

* cited by examiner

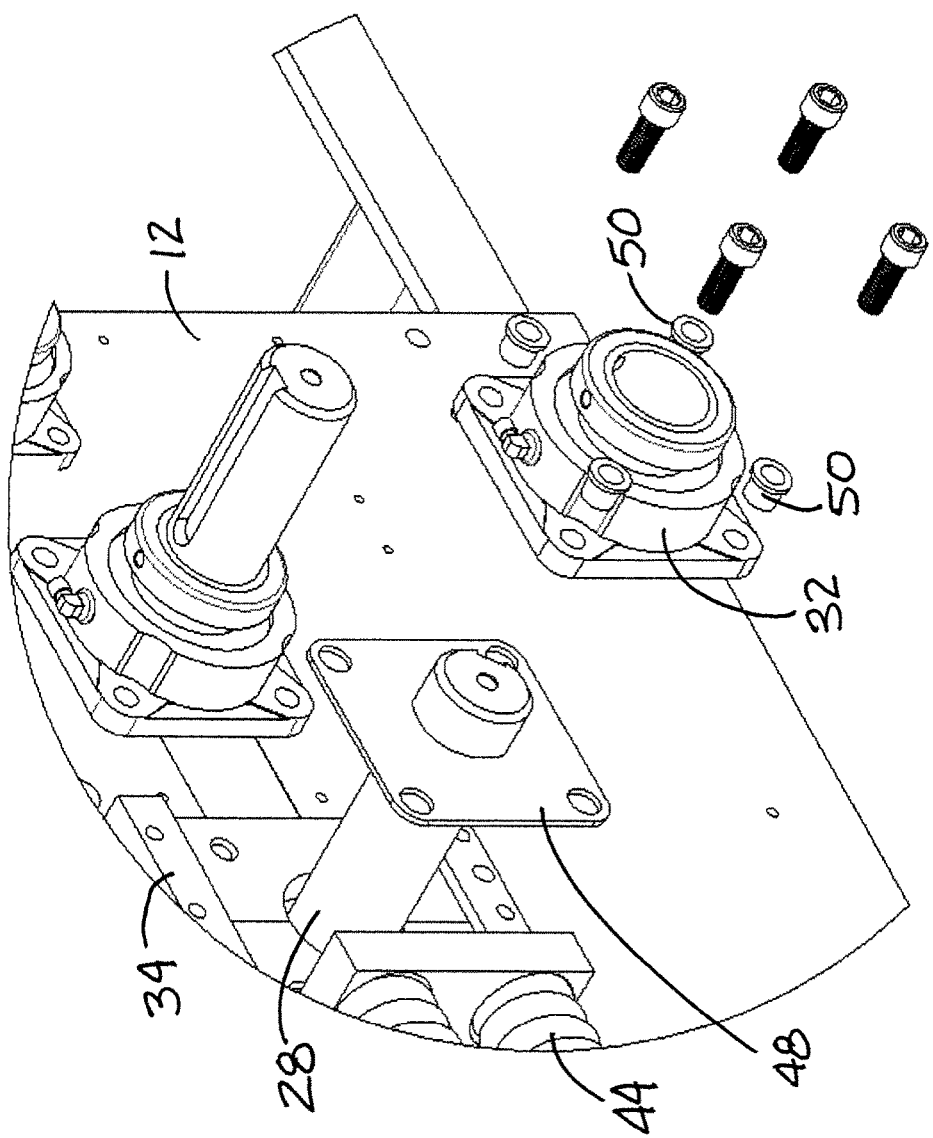

ROLL ADJUSTMENT SYSTEM

REFERENCE TO RELATED APPLICATION

This application is a continuation-in-part of U.S. patent application Ser. No. 15/225,441, filed Aug. 1, 2016, which is a continuation-in-part of U.S. patent application Ser. No. 14/821,936, filed Aug. 10, 2015, each of which is hereby incorporated by reference in its entirety.

BACKGROUND

Field

The present disclosure relates to adjustable rolls such as can be used on grinding equipment and more particularly pertains to a new roll adjustment system for detecting the zero point for a movable roll more safely and accurately.

Description of the Prior Art

In machinery utilizing rolls or rollers (the terms being used interchangeably in this description), such as grain processing apparatus, the rolls typically have teeth formed on the substantially cylindrical outer surface to grind or substantially pulverize the grain particles passing between a pair of the rolls, or multiple pairs of rolls arranged in series with respect to each other. The separation gap between the pair of rolls is very important to achieving a ground product that has the desired particle size and consistency. However, the separation gap needs to be changed or adjusted from time to time due to, for example, a desired change in the character of the output product, loss of the proper position adjustment of the rolls, wear on the parts of the apparatus (e.g., the teeth on the rolls), as well as other reasons.

For example, during startup of the grinding apparatus, the roll separation gap is typically adjusted to a suitable or desired setting. To do so, a proper zero location or point for the movable roll must be determined from which the separation gap may be measured. The zero location may be defined as the position of the movable roll in which the movable and stationary rolls are in contact with each other, or at least the ends of the rolls are in contact with each other, such that the rotation axes of the rolls are presumed to be substantially parallel.

The zero location is thus determined by detecting when the rolls just contact each other to establish a zero point. Then adjustment of the separation gap may be made between the rolls based upon the zero point. In some apparatus, the separation gap between the rolls may be adjusted by moving the position of the bearings supporting the ends of the movable roll. Each of these bearings may include a spring-loaded mount in which a threaded bolt or rod is used to adjust the position of the bearing of the movable roll with respect to the other (stationary) roll. Rotation of the bolt or rod moves the bearing, and the corresponding end of the movable roll, closer to or further away from the stationary roll depending upon the direction of rotation of the bolt or rod.

The process of adjusting the separation gap between the rolls may initially entail operating the apparatus so that the rolls rotate in a spaced relationship of (usually) unknown separation gap, and then moving the rotating movable roll relatively closer to the rotating stationary roll until contact is detected between the movable and stationary rolls. The point at which contact is detected is considered to be the zero point for the movable roll.

Accurately detecting the initial point of contact between the rotating rolls can be difficult. One way of detecting contact (or imminent contact) requires the insertion of a feeler gauge between the movable and stationary rolls, and when a feeler gauge can no longer be inserted between the rolls, contact between the rolls is detected and the zero point is identified. Another way of detecting contact requires the operator to listen for the sound produced by the initial contact of the rotating rolls as the moving roll moves toward the stationary roll, to thereby identify the zero point.

SUMMARY

The present disclosure relates to a system comprising a frame, a pair of rolls including a first roll and a second roll. The rolls may comprise a roll body having opposite ends and a circumferential surface, a plurality of teeth formed on the circumferential surface, and at least a portion of the circumferential surface being electrically conductive. The rolls may also comprise a roll shaft having end portions extending from the roll body with each of the end portions extending from one of the ends of the roll body. Roll supports may be configured to support the rolls on the frame in a manner such that at least one of the rolls is movable to adjust a separation gap between the rolls. The system may also include a detection apparatus configured to detect contact between the rolls, and a signaling apparatus configured to produce a signal when the detection apparatus detects contact between the rolls.

In another aspect, the disclosure relates to a system comprising a frame, a pair of rolls with the rolls including a first roll and a second roll. Each of the rolls has a circumferential surface, a plurality of teeth being formed on the circumferential surface, and at least a portion of the circumferential surface being electrically conductive. The system may also comprise roll supports configured to support the rolls on the frame in a manner such that at least one of the rolls is movable to adjust a separation gap between the rolls, and a detection apparatus configured to detect contact between the rolls. The system may also comprise a signaling apparatus configured to produce a signal when the detection apparatus detects contact between the rolls, and an adjustment apparatus configured to receive the signal from the signaling apparatus and change movement of one of the rolls with respect to the other of the rolls.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, and the particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein:

FIG. 4 is a perspective view of a portion of the system including an end portion of the first roll and the respective roll support with elements of the isolating assembly.

DETAILED DESCRIPTION

Figure 1:
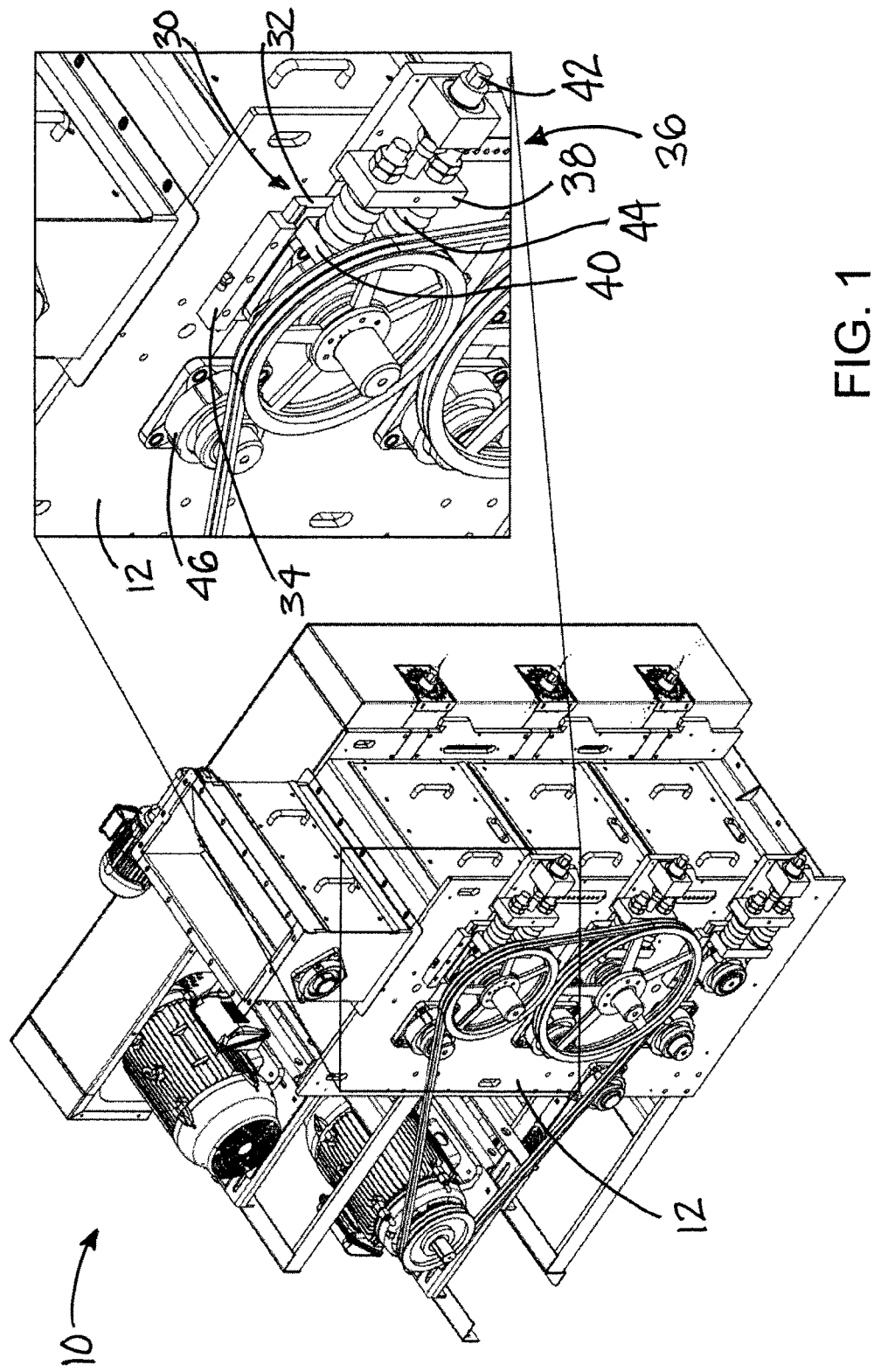
FIG. 1 is a schematic perspective view of an illustrative grinding apparatus suitable for employing the new roll adjustment system according to the present disclosure.
Figure 2:
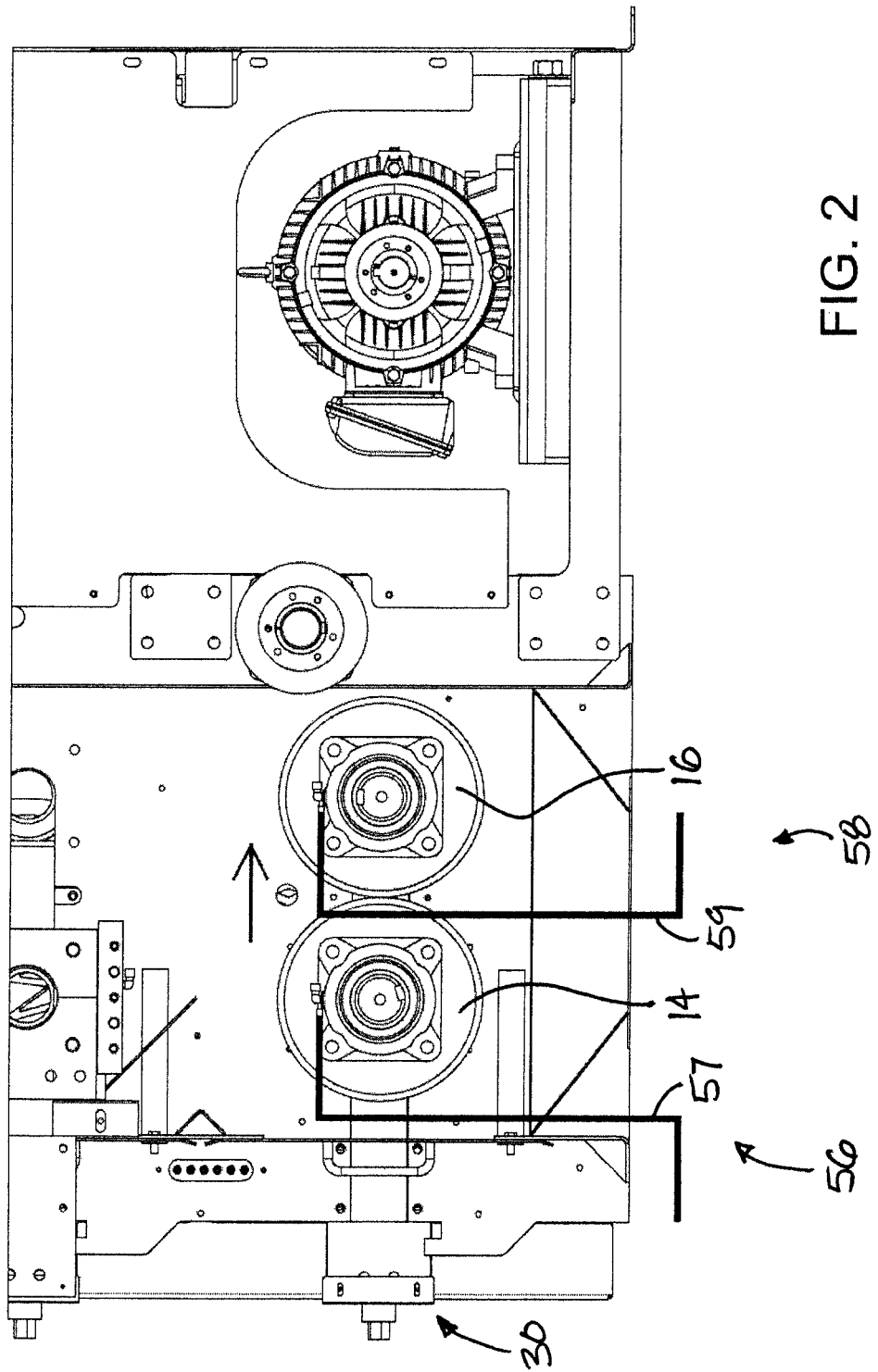
FIG. 2 is a schematic side view of a grinding apparatus with the new roll adjustment system, according to an illustrative embodiment.
Figure 3A:
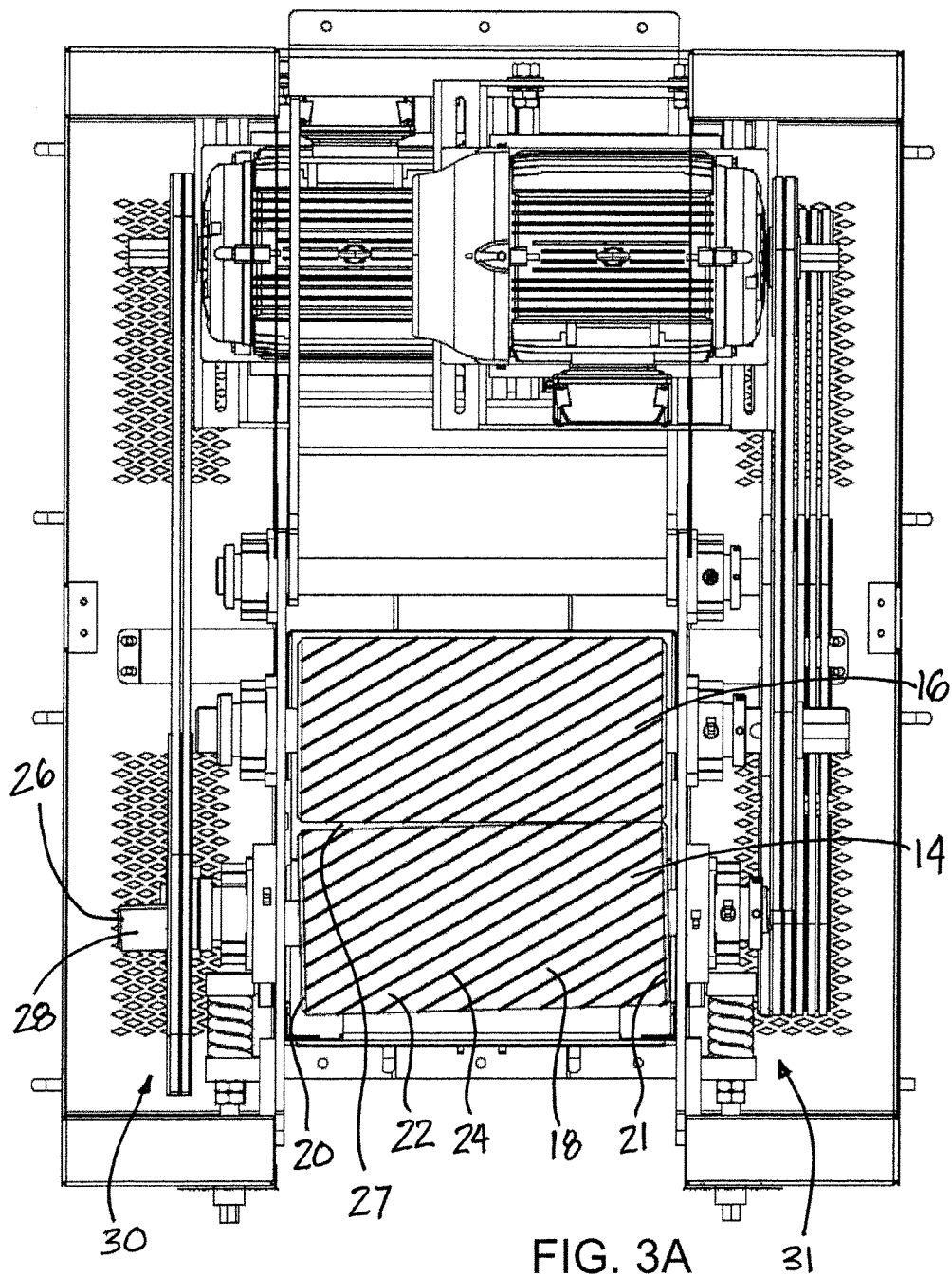
FIG. 3A is a schematic sectional view of the grinding apparatus with the roll adjustment system, according to an illustrative embodiment, with one end of the movable roll in a zero position with respect to the stationary roll and thus completing a circuit.
Figure 3B:
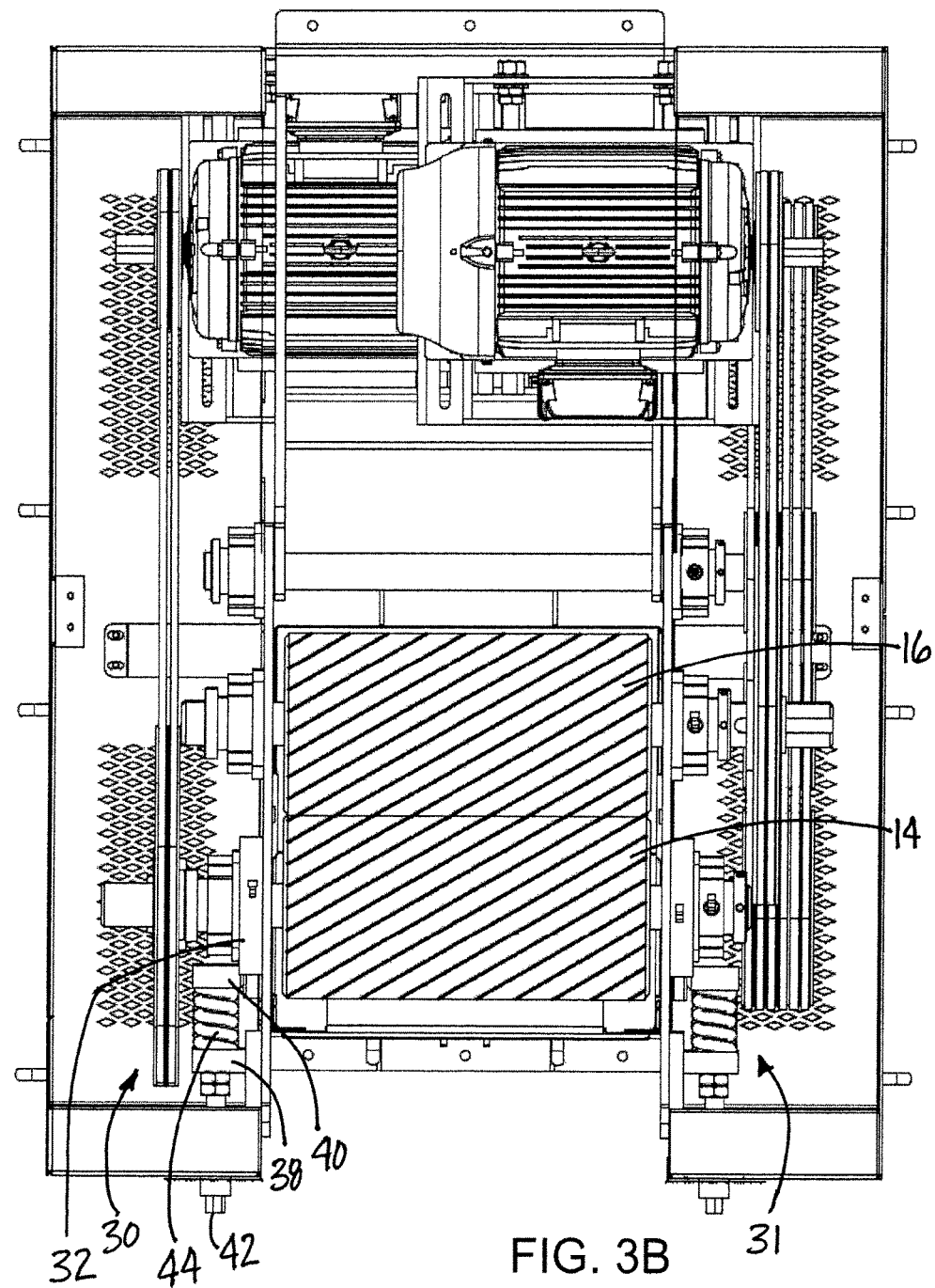
FIG. 3B is a schematic sectional view of the grinding apparatus with the roll adjustment system, according to an illustrative embodiment, with both ends of the movable roll in a zero position with respect to the stationary roll and thus completing a circuit.
Figure 3C:
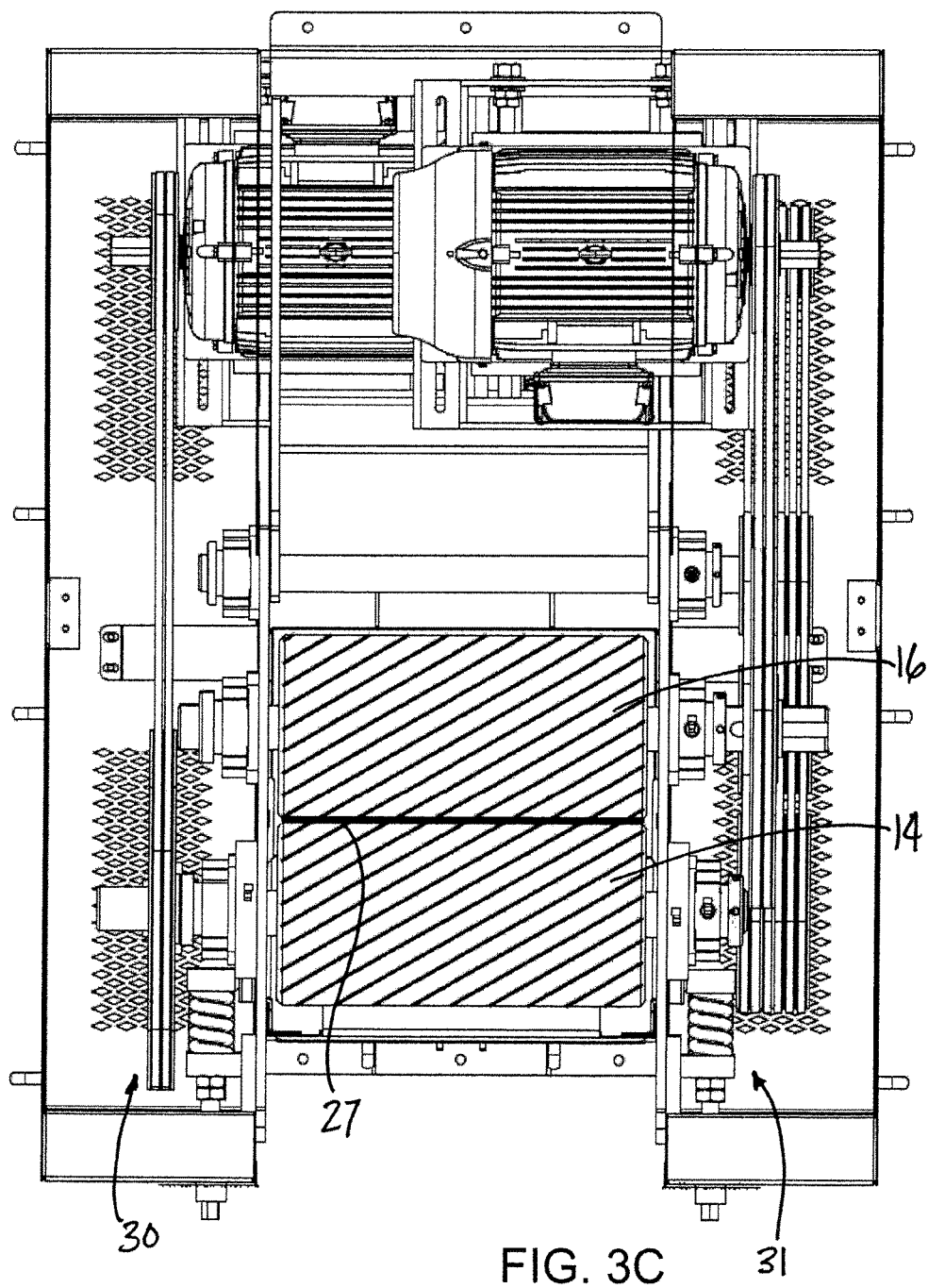
FIG. 3C is a schematic sectional view of the grinding apparatus with the roll adjustment system, according to an illustrative embodiment, with the movable roll separated by a uniform separation gap from the stationary roll and thus not completing the circuit.
Figure 5:
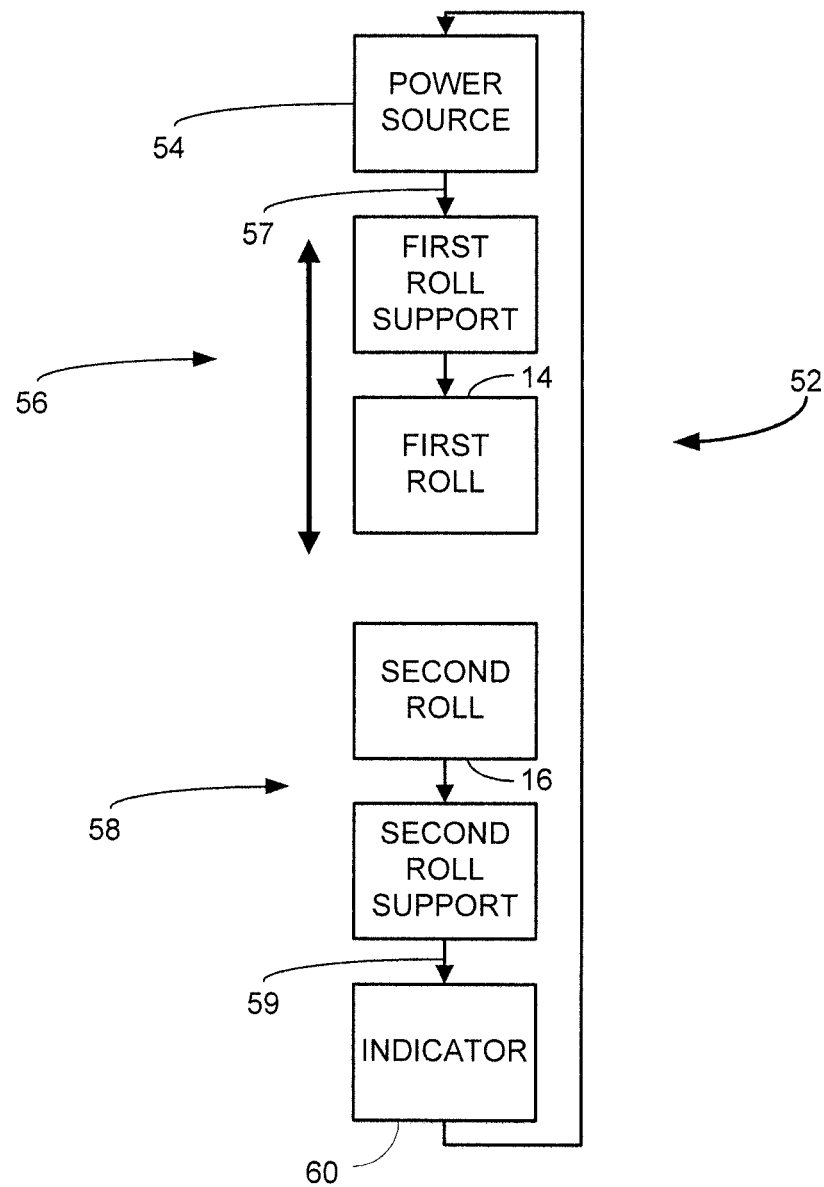
FIG. 5 is a schematic diagram of elements of an embodiment of the system.
Figure 6:
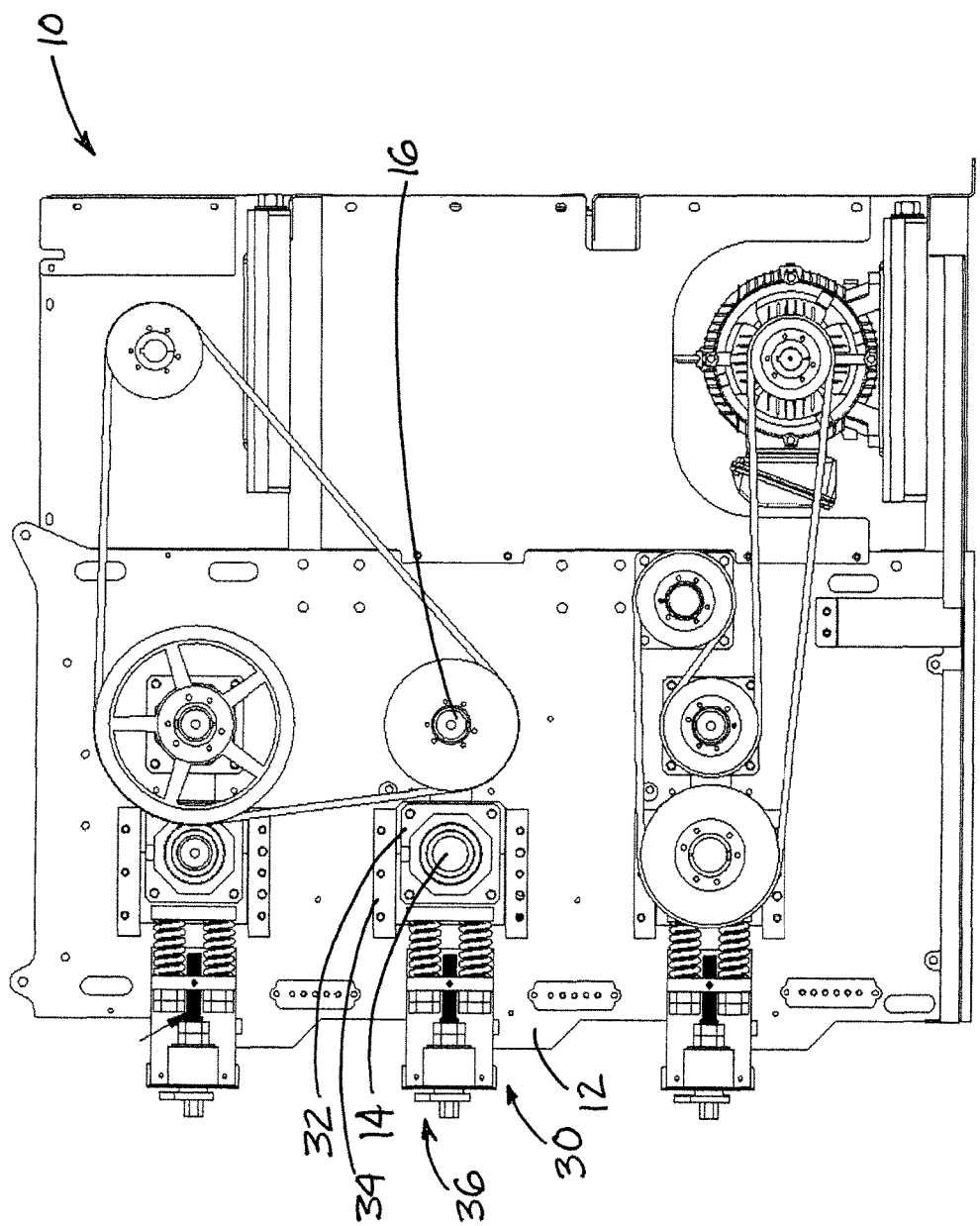
FIG. 6 is a schematic side view of an embodiment of an illustrative grinding apparatus.
Figure 7:
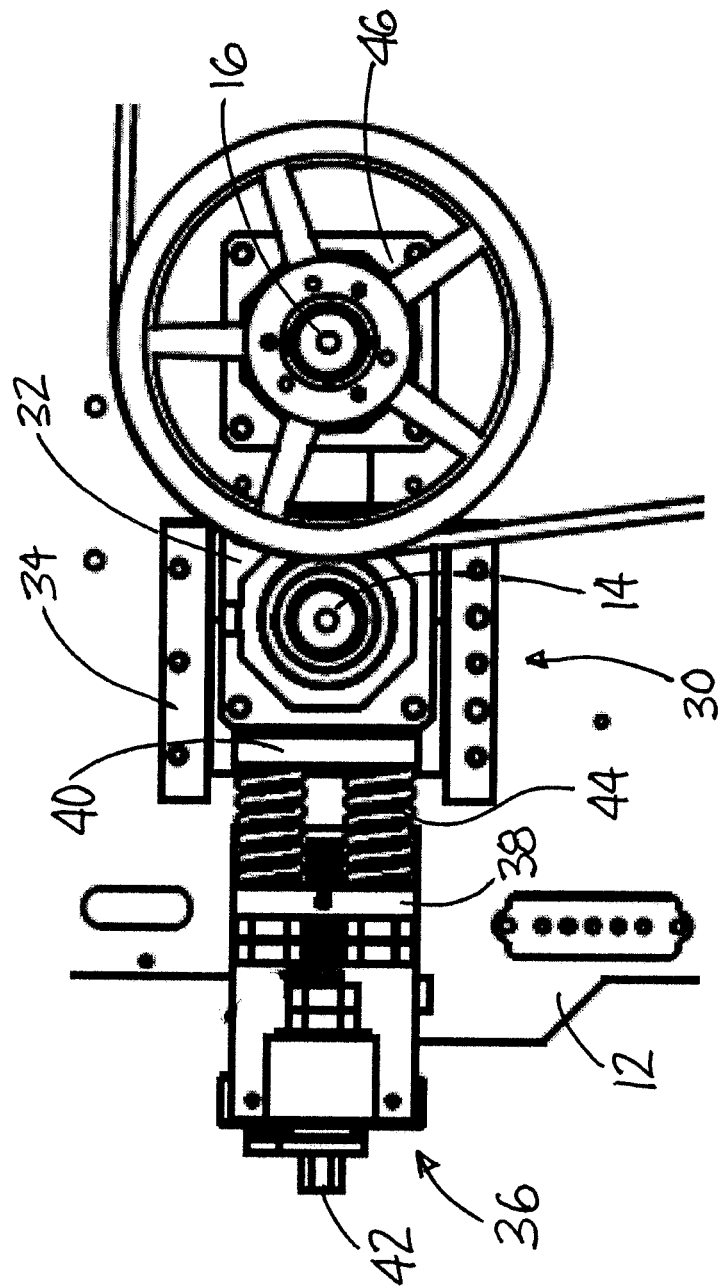
FIG. 7 is a schematic enlarged view of a portion of the side of the illustrative embodiment of FIG. 6.
Figure 8:
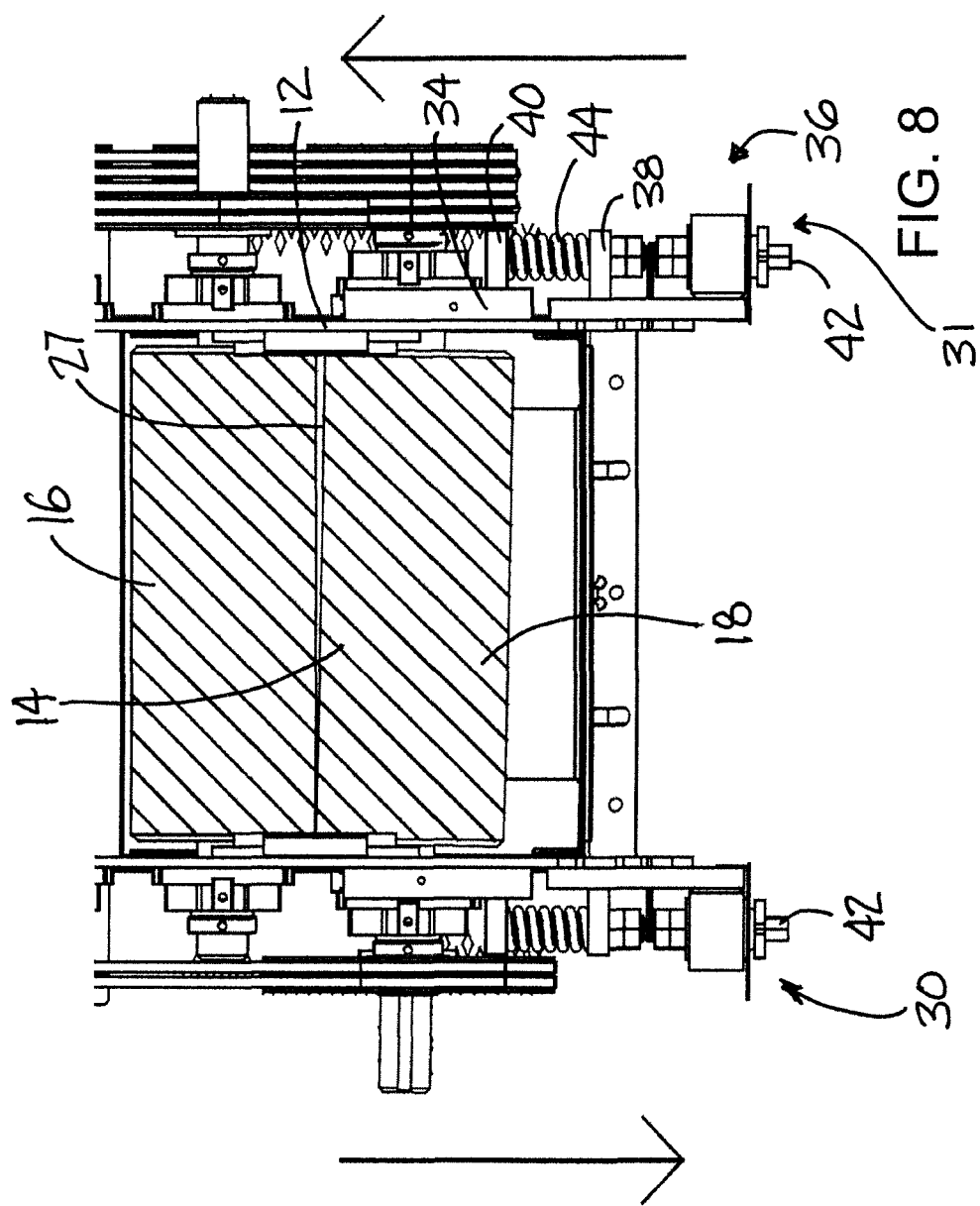
FIG. 8 is a schematic enlarged view of a portion of the top of the illustrative embodiment of FIG. 6.
Figure 9:
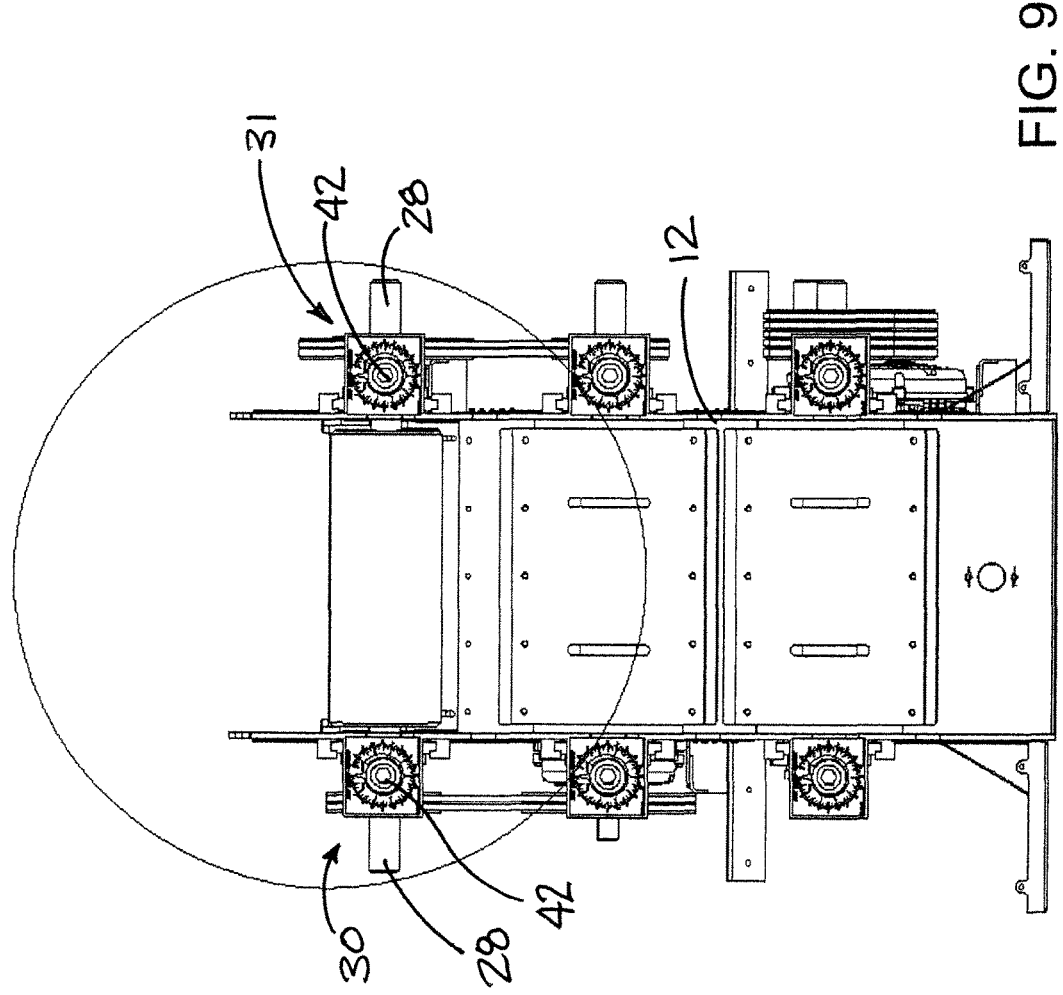
FIG. 9 is a schematic end view of the illustrative embodiment of FIG. 6.
Figure 10:
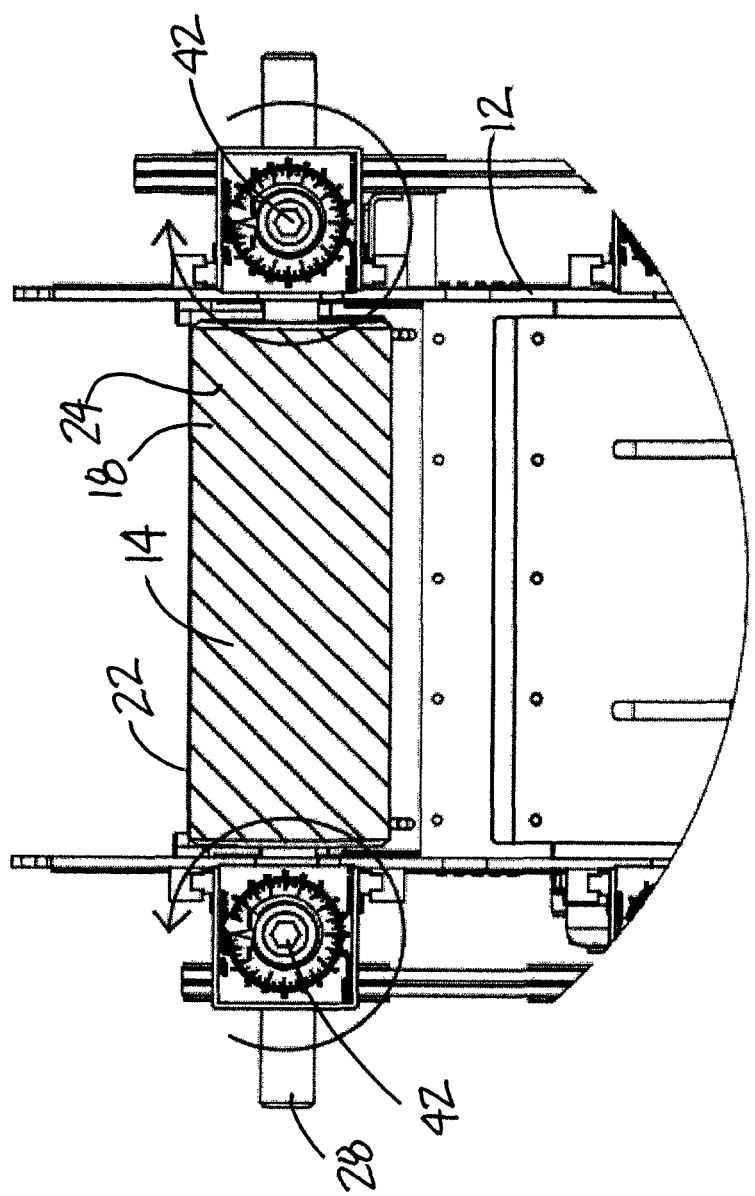
FIG. 10 is a schematic enlarged view of a portion of the end of the illustrative embodiment shown in FIG. 9.
Figure 11:
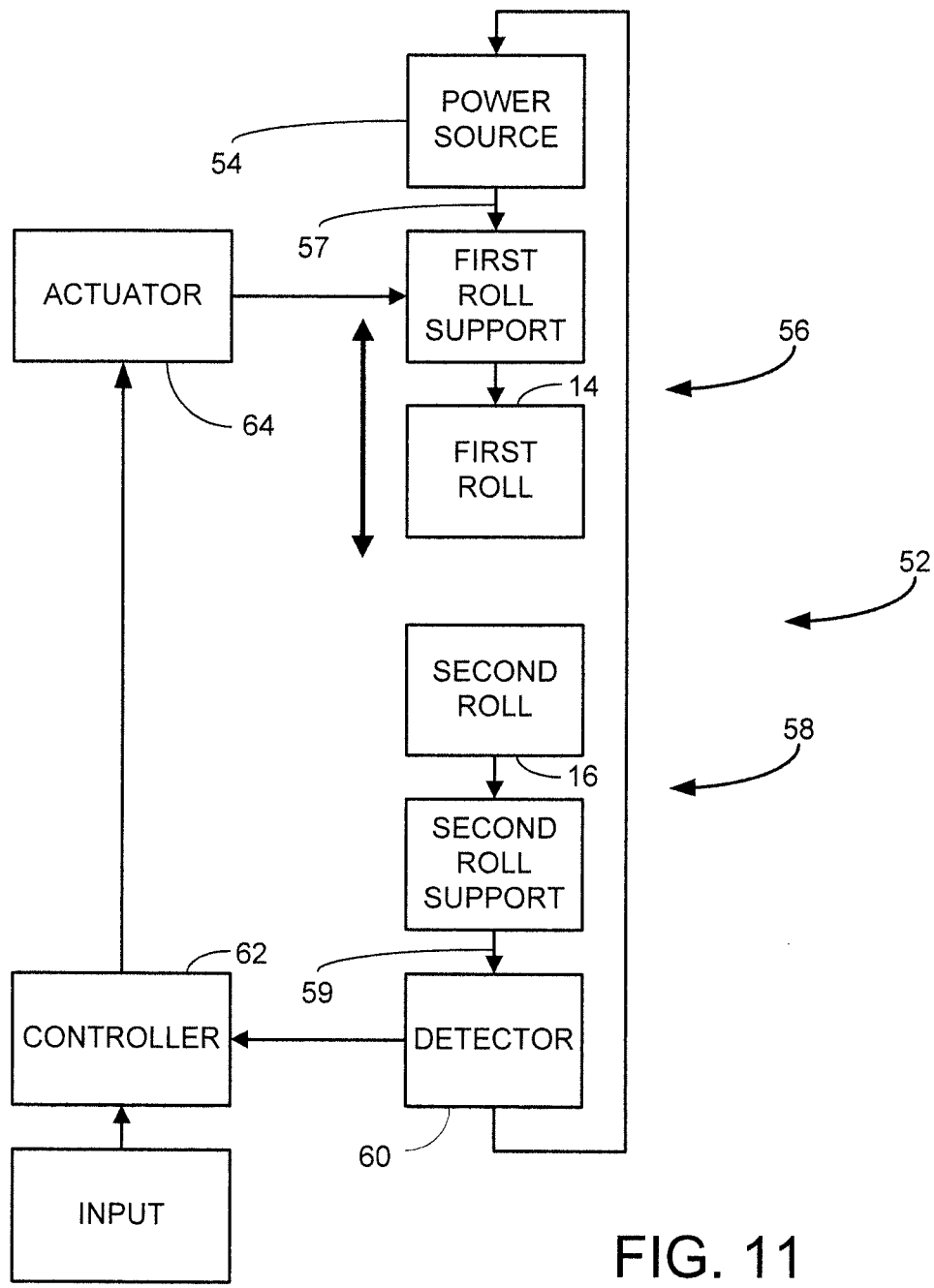
FIG. 11 is a schematic diagram of elements of an embodiment of the system.
Figure 12A:
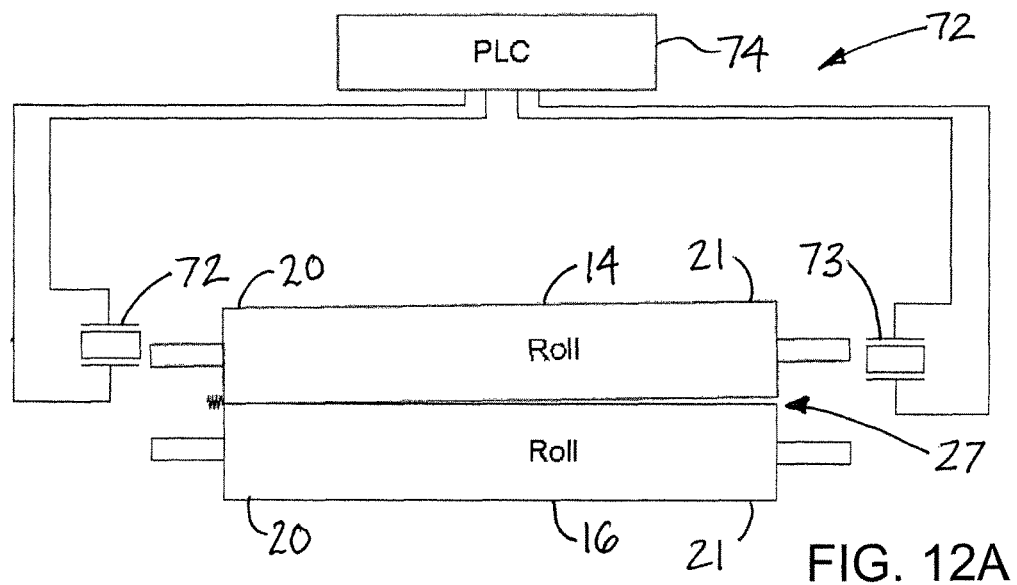
FIG. 12A is a schematic diagram of portions of an embodiment of the grinding apparatus with elements of a vibration sensing system and showing the first ends of the rolls being in contact while second ends of the rolls remain spaced.
Figure 12B:
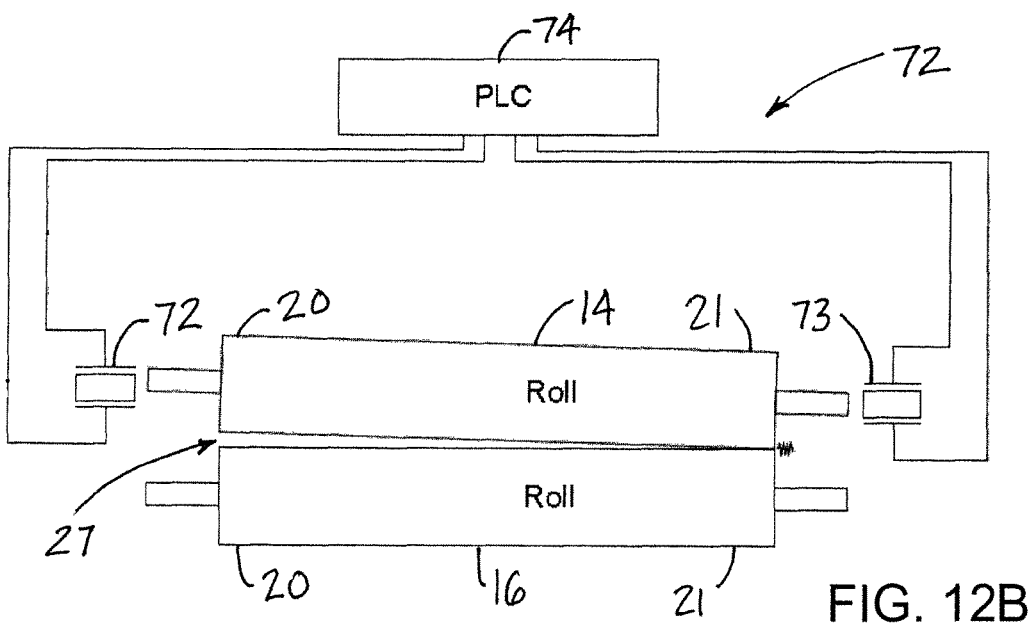
FIG. 12B is a schematic diagram of portions of the embodiment of the grinding apparatus with elements of the vibration sensing system and showing the second ends of the rolls being in contact while first ends of the rolls remain spaced.

With reference now to the drawings, and in particular to FIGS. 1 through 15 thereof, a new roll adjustment system embodying the principles and concepts of the disclosed subject matter will be described.

The applicants have recognized that problems exist with the known techniques for zeroing, or finding the zero location, for a movable roll of a pair of rolls of an apparatus in that the techniques may not be very accurate in establishing a zero point and may be hazardous to the operator attempting to perform the zeroing operation. For example, using the technique of listening for the sound of the initial contact of the rolls may be difficult to perform in the typically loud environment of a milling facility, especially for inexperienced machine operators, and a hard collision between the rolls which damages the teeth on the rolls may result. Even when the technique is performed by an experienced operator able to reliably detect the initial contact between the spinning rolls, the technique imposes additional wear to the rolls over the long term that is likely to shorten the useful life of the teeth on the roll. Using the technique of insertion of a feeler gauge between the rotating and moving rolls can also be hazardous to the operator.

Further, the applicants have recognized that due to variations in the frame structure of the apparatus and the rolls themselves, it is preferable to adjust the ends of the movable roll independently of each other to establish a zero point for each end rather than moving both ends at the same time. Then adjustment of the separation gap may be made between the corresponding ends of the rolls based upon those zero points. The process of adjusting the separation gap between the rolls may include operating the rolls rotate in a spaced relationship and then moving one end of the rotating movable roll relatively closer to the rotating stationary roll until contact is detected between the end of the movable roll and the stationary roll. The point at which contact is detected is considered to be the zero point for that end of the movable roll, and may be repeated for the opposite end of the movable roll with respect to the stationary roll.

In light of these problems, the applicants have developed a system and method for detecting the zero point for a pair of rolls in a manner that is believed to be more easily and accurately (and safely) performed even by those with relatively less operational experience. In some aspects of the disclosure, the pair of rolls of the apparatus effectively function as an electrical switch to complete a circuit, and completion of the circuit may be used to signal and inform the operator that the rolls have contacted each other and the movable roll is at the zero location or point relative to the stationary roll. An electrical charge may be applied to one of the rolls and the other roll is electrically isolated from the charged roll (and may also be isolated from the frame). A conductor is electrically connected to the isolated roll so that when contact is made between the rolls (e.g., between the movable and the stationary rolls) a circuit is completed and current may flow between the rolls. The completion of the circuit may provide a means for signaling or indicating that contact between the rolls has occurred, without requiring the operator to hear the contact or insert an object such as a feeler gauge. The completion of the contact detecting circuit can be performed while the rolls are rotating or not rotating. The completion of the circuit and the resulting current flow may also be employed to provide a signal to a controller or computer or other processor indicating that contact between the rolls has been made, which in turn may be used to control devices that automatically adjust the position of the movable roll to achieve the separation gap required for a particular task or operation. In this way, adjustment of the position of the movable roll, and therefore the separation gap, may be performed automatically rather by than the aforementioned manual techniques.

In some aspects, the disclosure relates to a system 10 which may have as its purpose the grinding or crushing or otherwise processing a material, typically a particulate material which may include various grains or other foodstuffs. Such apparatus may include one or more stages of grinding or processing that progressively change the grain, such as by grinding the particles into smaller and smaller sizes. It should be recognized that while the illustrative embodiments of this disclosure primarily relate to apparatus for processing particles into smaller particles, aspects of the concept may be applied to other apparatus employing rotatable objects in which a spacing therebetween is adjustable from a zero point at which the objects are in contact.

Illustrative systems 10 that may be suitable for the implementation of the aspects of the disclosure may include a frame 12 and a pair of rolls 14, 16 mounted on the frame in a manner permitting rotation of the rolls. While suitable systems may include more than one pair of the rolls, and each pair of rolls may have a different spacing than the other pairs in order to create progressively finer product passing through the system. For the purposes of this description a single pair of rolls will be described with the understanding that additional pairs of rolls of a system may utilize multiple similar or identical elements. The pair of rolls may include a first roll 14 and a second roll 16 that are generally oriented substantially parallel to each other and may rotate in the same or opposite rotational directions. Each of the rolls 14, 16 may include a roll body 18 with opposite ends 20, 21 and a circumferential surface 22 extending between the ends 20, 21. Typically the circumferential surface 22 is substantially cylindrical in shape, and includes a plurality of teeth 24 that are formed on the circumferential surface which protrude outwardly to some degree from the surface 22 and are effective for the grinding or otherwise processing the material moving through the system 10. In some embodiments the teeth 24 extend from the first end 20 to the second end 21, and may be substantially straight between the opposite ends 20, 21, and may be substantially continuous between the ends, although the particular form of the teeth is not necessarily critical to the disclosure and other teeth configurations may be employed.

Each of the rolls 14, 16 may also include a roll shaft 26 that may extend through the roll body 18 and have end portions 28 which are exposed and extend from the opposite ends 20, 21 of the roll body. The end portions 28 of the roll shaft 26 may have a substantially cylindrical shape that is suitable for being journalled in a bearing for rotation with respect to the bearing.

At least a portion of the roll body 18 may be electrically conductive or able to carry an electrical current. The conductive portion may be located on the body such that the portion is likely to be the first portion of the roll that contacts the other roll when the rolls are moved toward each other from a spaced condition. Illustratively, at least a portion of the circumferential surface 22 of the body 18 may be electrically conductive, and at least some of the teeth may be electrically conductive. Typically, although not necessarily, the electrically conductive portion of the circumferential surface is formed of a conductive metal such as steel.

In the illustrative embodiments of the system 10, one of the rolls may be a stationary roll which is mounted to the frame 12 in a manner such that the stationary roll is substantially immovable with respect to the frame during normal use of the system, and the other one of the rolls is a movable roll which is mounted on the frame in a manner that permits movement of the movable roll with respect to the stationary roll. Although this is the preferred configuration for the purpose of greater simplicity, both of the rolls may be mounted on the frame in a manner that permits both rolls to move with respect to the frame. The movable roll is thus movable with respect to the frame, but is also movable with respect to the stationary roll such that the movable roll is able to move toward and away from the stationary roll to adjust a size and character of a separation gap 27 between the rolls. In some embodiments, the movable roll may be mounted on the frame 12 in a manner that permits independent movement of the ends 20, 21 with respect to the stationary roll, and also with respect to the frame, so that the magnitude of the separation gap may vary between the ends. In the illustrative embodiments of this description, the first roll 14 forms the movable roll and the second roll 16 forms the stationary roll.

The system may also include one or more roll supports, with each roll support receiving one of the end portions 28 of one of the roll shafts 14, 16 to thereby support the respective roll body on the frame in the indicated manner (e.g., movable or stationary). Each of the roll supports may include a bearing or other suitable structure for supporting a portion of a rotating shaft. The roll supports may include at least one movable roll support assembly 30 for supporting the roll shaft of the movable roll on the frame, and in embodiments a pair of movable roll support assemblies 30, 31 may be employed with each assembly supporting one of the end portions 28 of the roll shaft of the movable roll 14. The movable roll support assemblies 30, 31 may be movably mounted on the frame to permit movement of the movable roll toward and away from the stationary roll to thereby change and adjust the size of the separation gap 27 between the rolls 14, 16.

Illustratively, each of the movable roll support assemblies 30, 31 may include a bearing block 32 which is movably mounted on the frame, and may be slidably mounted on the frame by one or more guides 34 mounted on the frame that effectively form a track for the bearing block to move toward and away from the stationary roll 16. The movable roll support assemblies 30, 31 may also include an adjustment structure 36 which is configured to adjust a position of the bearing block with respect to the stationary roll 16 and also with respect to the frame 12. An illustrative adjustment structure includes a stop 38 mounted on the frame 12, a brace 40 mounted on the bearing block 32, and an adjustment member 40 which is configured to move the brace with respect to the stop, and thereby move the bearing block with respect to the frame. A portion of the exterior of the adjustment member 42 may be threaded, and the threaded portion of the adjustment member may extend through a threaded hole in the brace 40 such that rotation of the adjustment member in a first rotational direction moves the brace toward the stop 38 and rotation of the adjustment member in a second rotational direction moves the brace away from the stop.

Each of the movable roll support assemblies 30, 31 may also include a biasing structure 44 which is configured to bias movement of the movable roll toward or away from the stationary roll 16, and may accomplish this through biasing the bearing block 32 toward or away from the roll 16. Illustratively, the biasing structure 44 may comprise a spring which is positioned between the stop 38 and the brace 40 to push the brace away from the stop and thereby urge the bearing block to move toward the stationary roll subject to the adjustment by the adjustment member 42.

The roll supports may also include a stationary roll support 46 for supporting the roll shaft 26 of the stationary roll 16. A pair of the stationary roll supports 46 may be employed to support the opposite end portions of the roll shaft, and may each comprise a bearing mounted on the frame in a manner that is configured to hold the stationary roll 16 in a fixed position on the frame during normal operation of the system, such as by being directly bolted to the frame.

The system 10 may also include an electrical isolation assembly which is configured to electrically isolate or insulate at least one of the rolls 14, 16 from the frame, and may be employed to isolate both of the rolls 14, 16 from the frame. In some embodiments, the isolation assembly isolates the roll support that is supporting the isolated roll from the frame to thereby prevent an electrical current to travel between the frame and the roll support or the roll supported by the roll support. Illustratively, the electrical isolation assembly may comprise an insulating pad 48 which is configured to be positioned between the roll support for the isolated roll and the frame 12 to thereby electrically isolate the roll support from the frame by virtue of the insulating pad being positioned between the roll support and the frame. The electrical isolation assembly may also include at least one insulating sleeve 50 which is positioned over at least one fastener employed to mount the roll support to the frame, and is preferably positioned over each of the mounting fasteners employed to mount the roll support on the frame. The insulating sleeve 50 may be configured so that the shaft of the mounting fastener as well as any head or nut on the fastener is also electrically isolated from contact with the roll support. The insulating pad 48 and the insulating sleeve 50 may be formed from an electrically non-conductive material such as a plastic or composite.

The system 10 may also include a detection apparatus 52 which is configured to detect contact between the rolls, and the detection apparatus may be configured to detect a change in electrical potential of at least one of the rolls which may result from contact between the rolls. The detection apparatus 52 may comprise a power source 54 which is configured to provide an electrical potential, and the power source may comprise a battery or the electrical service of a building supplied by a electrical utility. The detection apparatus 52 may also include a connection structure 56 which is configured to connect the power source 54 to the first roll 14. The connection structure 56 may include a first or connection conductor 57 which electrically connects the power source 54 to the first roll. The first conductor 57 may be connected to the roll support for the first roll, and illustratively may be electrically connected to the movable roll support assembly 30 for the first roll. For example, the first conductor 57 may be electrically connected to the bearing block 32 on which one of the end portions of the roll 14 is mounted. Usually the first conductor 57 may only need to be connected to one movable roll support assembly supporting one end portion of the roll shaft, particularly if the roll shaft is formed of an electrically conductive material such as steel. Conduction of electricity along an electrical path from the end portion of the roll shaft, through the roll shaft and through the roll body (or at least a portion thereof) to the conductive portion or portions of the circumferential surface 22 of the roll 14 effectively provides an electrical path between the connection structure 56 and the conductive portion of the surface.

The detection apparatus 52 may also include a reception structure 58 which is configured to connect the power source to the second roll 16 such that contact between the first 14 and second 16 rolls creates a complete electrical circuit through the rolls and to the terminals of the power source. The reception structure 58 may comprise a second or reception conductor 59 which may be electrically connected to the second roll support such as by a wire connected to the roll support. An electrical path may be formed between the roll support through the end portion of the roll shaft and roll body of the roll 16 to the conductive portion of the circumferential surface of the roll 16.

As the location of the rolls in the system 10 may be considered to be hazardous due to the presence of dust and fine particles, and therefore the circuit may utilize a limited current and voltage and may not permit any surge or accidental wire connection possibly allowing for a short circuit. An intrinsically safe barrier may be used on the input and output sides of the circuit. An illustrative circuit may utilize a voltage of less than 12 VDC and may limit current to less than 10 mA.

The system 10 may also include a signaling apparatus 60 which is configured to produce a signal that indicates that a change in the electrical potential of at least one of the rolls is detected, such as through the flow of current through the rolls resulting from contact between the rolls. The signaling apparatus 60 may be an element in the circuit formed by the power source 54, the connection structure 56, the rolls 14, 16, and the reception structure 58 such that a current flowing through the rolls is also caused to flow through the signaling apparatus.

The signaling apparatus 60 may be configured to produce a perceptible signal which is perceptible by one of the senses of a human being (e.g., visual, audible, or tactile) and/or may produce a signal in a digital or analog form that is able to be transmitted to a device able to receive and be triggered in some manner by the signal. The signaling apparatus 60 may be configured to produce a visually-perceptible signal or indicator such as a light emitting device (e.g., a bulb or LED) that illuminates to provide the visually-perceptible signal. The signaling apparatus may also comprise an audibly-perceptible signal or indicator that is able to be heard by an operator (e.g., a horn or buzzer or bell). The signaling apparatus may include an indicator that produces a tactilely-perceptible indicator such as a vibration or other form of movement that may be picked up by the touching of the skin to a surface or control. The types of signals described are not mutually exclusive and may be used in combination with each other.

The signal may also be in the form of a current or change in voltage potential that is provided to a logic element such as a programmable logic controller, processor, analog to digital converter, or other device that converts or processes the signal to a suitable form for control circuitry configured to act upon the detection of contact of the rolls.

Apparatus that may utilize the signal may include an automated adjustment apparatus that operates or causes the system to automatically adjust the position of the movable roll to a desired separation gap distance from the stationary roll intended to produce a ground material of a particular character. For example, as illustratively shown in FIG. 11, the signaling apparatus 60 may form a detector that generates a signal to a controller 62 that is indicative of the position of the rolls with respect to each other, such as whether the rolls are in contact with each other in the zero location or not. This signal may be used by the controller 62 to move one of the rolls through the respective roll support toward the other roll (and thus toward the zero location for the roll) or away from the zero location toward an operational location of the roll which corresponds to a desired separation gap. The controller 62 may signal an actuator 64 to operate the roll support to move the roll, and illustratively the actuator may be a motor that rotates a threaded rod to move the roll support although other types of actuators may be employed. The desired separation gap may be signaled to the controller 62 in any suitable manner, such as a manual input panel 66 or a computer processor. Significantly the structure and circuitry depicted in FIG. 11 may be utilized on each side of the apparatus and the respective roll ends of the apparatus, such that each of the ends of the movable roll of the pair of rolls is independently movable in an automated manner.

In operation, the adjustment apparatus may cause the movable roll to move toward the other roll, and when a signal is received from the signaling apparatus that contact between the rolls has occurred, the adjustment apparatus may discontinue or stop the movement of the roll and the zero location recorded, The movement of the roll may be conducted using actuators 64 for both roll supports or may be conducted using only one actuator acting on one roll support (and thus one end of the roll) at a time, with the zero point for one end being detected first and the other end being detected after the one end. The adjustment assembly may cause the actuators to back the one (first) end of the moving roll away from the stationary roll before the other (second) end is moved toward the stationary roll. Once the zero location, or zero points, of the roll being adjusted have been determined, then the adjustment assembly may use that zero point data to move the ends of the rolls (through the respective actuators) to the appropriate adjustment point to create the desired separation gap.

Another aspect of the disclosure relates to a method of positioning a roll with respect to another roll in a system, such as a processing or grinding or milling apparatus. The method may include providing a system having some or all of the elements and features set forth in this disclosure, and applying an electrical potential to a first one of the rolls, such as by connecting the first roll to a terminal of an electrical power source, and electrically connecting a second one of the rolls to another terminal of the power source. The method may also include moving a movable one of the rolls toward a stationary one of the rolls, and may include moving a first one of the ends of the movable roll toward a first one of the ends of the stationary roll. A further aspect of the method may include detecting a change in the electrical potential in the second one of the rolls and/or detecting an electrical current flow from the first roll to the second roll, and producing a signal when a change in the electrical potential of the second roll, or a current flow, is detected. The method may further include discontinuing movement of the movable roll toward the stationary roll upon the detection, such as discontinuing movement of the first end of the movable roll toward the first end of the stationary roll, and determining a zero point for the first end of the movable roll when the change in electrical potential or current is detected. The method may also include moving a second one of the ends of the movable roll toward a second one of the ends of the stationary roll, detecting a change in the electrical potential in the second roll and/or detecting an electrical current flow from the first roll to the second roll, and producing a signal when a change in the electrical potential of the second roll, or a current flow, is detected. The method may further include discontinuing movement of the movable roll toward the stationary roll upon the detection, such as discontinuing movement of the second end of the movable roll toward the second end of the stationary roll, and determining a zero point for the second end of the movable roll when the change in electrical potential or current is detected.

Other techniques may be utilized for detecting contact between the rolls to determine the zero point or points for the movable roll. In some optional implementations, such as the embodiment 70 shown in FIGS. 12A and 12B, a sensing device 72 may be utilized to sense changes in physical conditions of elements of the apparatus resulting from contact between portions of the rolls, such as, for example, a change in vibrations of elements of the apparatus caused by contact between the rolls. In some embodiments, a plurality of the devices 72, 73 may be utilized, with each of the devices being mounted proximate to one of the ends 20, 21 of at least one of the rolls 14, 16 as illustratively shown in FIGS. 12A and 12B. The sensing devices 72, 73 may comprise, for example, an accelerometer, or other device suitable to detect or sense vibration resulting from contact between the rotating rolls. The mounting and positioning of the sensing device or devices should be designed so that the device is able to sense or detect vibrations in at least one of the rolls, and in particular may be able to sense vibrations that result from even minimal contact between the surfaces or teeth of the rotating rolls. For example, the sensing devices may be mounted on the bearing mounting block 32 supporting the end of the roll on the frame of the apparatus. A processing device 74, such as a programmable logic controller (PLC) or other device with processing capabilities, may receive the signals from the sensing devices.

In the operation of such implementations, which may be performed as a preprogrammed sequence of operations that are not controlled by the operator of the apparatus, one or both of the rolls 14, 16 may be rotated. The corresponding or adjacent first ends 20 of the rolls may be moved toward each other, usually by the movement of the first end of a movable roll 14 towards the first end of a stationary roll 16 using the adjustment structure 36, such as a motor-rotated threaded screw or other suitable structure. The movement of the first end of the movable roll may continue until it is detected that the adjacent first ends of the rolls have made contact with each other. Detection of contact may be made by the processing device 74 and may be based upon changes in the signal or signals produced by the sensor device or devices 72, 73, such as the accelerometer. In some implementations, the signal may indicate changes in the frequency and/or amplitude of the vibrations detected by the accelerometer device. For example, the processing device may compare the signal from the sensing device when the rolls are rotating but known not to be in contact with each other to the signal currently being received from the device to determine if there is a change in the signal, or vibration, indicative of contact between the rolls. In another example, the processing device 74 may compare the signal generated by the sensing device located at the moving (e.g., first) end of the roll to the signal generated by the sensing device located at the non-moving other (e.g., second) end of the roll to determine if there is a difference in signals generated that would be indicative of contact of the moving first end of the roll with the first end of the second roll.

Upon determination that the first ends of the rolls have come into contact, movement of the first end of the movable roll may be discontinued and the processing device 74 may store information regarding the position of the (moving) end of the roll, which may be determined through the adjustment structure 36, as being the zero point or location of the zero gap between the first ends of the rolls. The first end of the movable first roll may be moved away from the first end of the stationary second roll. The second end of the movable first roll may then be advanced towards the second end of the stationary roll until contact is determined to occur in a similar manner to the determination of contact between the first ends of the rolls. The position of the second end of the movable first roll may be recorded as being the zero point or location of the zero gap between the second ends of the rolls. In some implementations, the movement of the first ends together to determine the zero point may be repeated two or more times and the data determine from each of the trials may be correlated together to establish a more accurate value for the corresponding zero point for the first ends of the rolls, and the same may be done for the second ends of the rolls to provide a more accurate value for the corresponding zero point for the second ends of the rolls. For example, the movements and position readings may be repeated until a group of the readings fall within acceptable tolerance range.

Movement of the ends of the movable first roll may be based upon the values determined for the zero points of the first and second ends in order to set a gap between the surfaces of the rolls to a desired measurement. Adjustments to the value of the zero point may be made based upon the various conditions, such as the wear that may be experienced by the outer surface of the roll. Wear on the surface of the roll will change the location of the zero or touch point for the ends of the rolls, and the adjustment may be made based upon known or estimated wear patterns.

Figure 13:
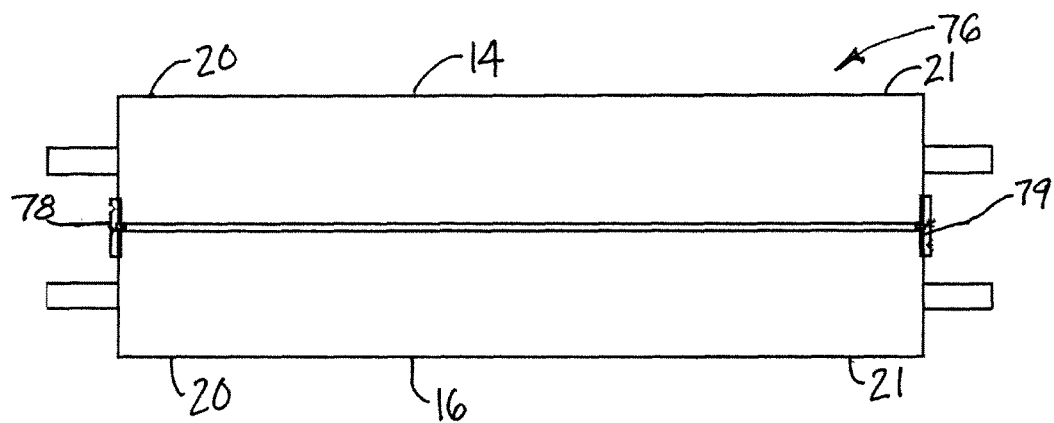
FIG. 13 is a schematic diagram of portions of an embodiment of the grinding apparatus with elements of a beam sensing system shown in relation to rolls in a substantially parallel relationship.
Figure 14:
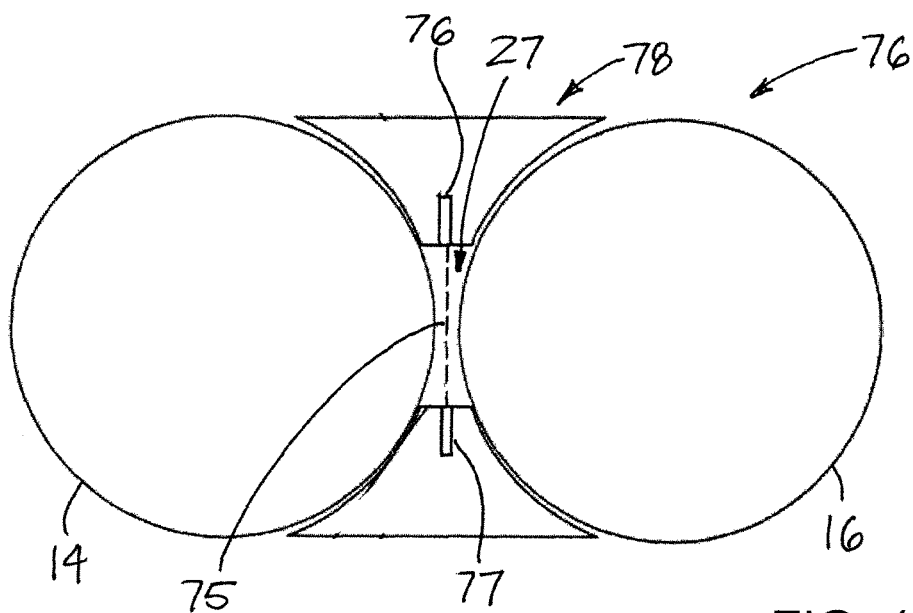
FIG. 14 is a schematic diagram of portions of an embodiment of the grinding apparatus with elements of the beam sensing system shown in relation to the ends of the rolls.
Figure 15:
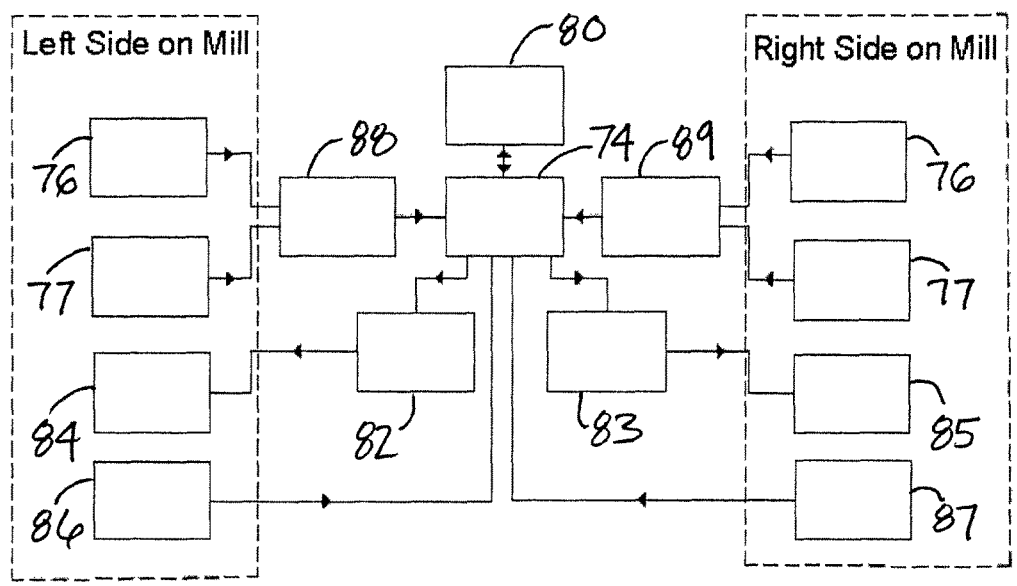
FIG. 15 is a schematic diagram of control and sensor elements of an embodiment of the system.

Another technique for detecting contact between the rolls for the purpose of determining the zero point or points for the ends of the movable roll is illustrated in the embodiment 76 shown in FIGS. 13 through 15, and involves the projection of a beam 75, such as a beam of visible light, into the gap 27 between the rolls to determine the point at which the beam is completely interrupted by the closing of the gap as a result of the movement of the moving roll towards the stationary roll. A beam generating device 76 may be positioned on one side of the gap 27 between the rolls, such as above or below the gap between horizontally spaced rolls, and a beam sensing device 77 may be positioned on the other side of the gap in opposition to the beam generating device so that the beam is transmitted from the generating device through the gap between the rolls and is received by the beam sensing device. A set 78.79 of the beam generating device and the beam sensing device may be located at each of the adjacent first ends and second ends of the first and second rolls in order to be able to detect a closing the gap at each of the ends.

The beam sensing device 76 may generate a signal which is transmitted to the processing device 74 so that the processing device is able to monitor the signal produced by the sensing device 76. The signal may vary based upon sensing or failing to sense the beam, and the variance in the signal may indicate to the processing device 74 that the beam has been obscured or interrupted by the gap 27 between the ends of the rolls becoming closed, or zero. The position information of the moving end of the roll may be recorded as the zero point when the signal indicates that the gap has been closed. The sequence of movements of the ends of the rolls as described above with respect to the vibration sensing apparatus may also be utilized for embodiments utilizing the light sensing apparatus.

An operator of the system 10 may initiate the sequence of operations through an apparatus control interface 80 which may communicate with the processing device 74 which in turn may control the motor drives 82, 83 (such as variable frequency drives) that each operate a position adjustment motor 84, 85 which each adjusts the position of a respective end of the movable roll. Roll position sensors 86, 87 associated with each of the ends of the movable roll are configured to sense the position of the roll end and provide positioning information to the processor 74. in some embodiments, signal amplifiers 88, 89 may be employed to enhance signals to and from the devices 76 and 77 as needed.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that the steps disclosed in the text and/or the drawing figures may be altered in a variety of ways. For example, the order of the steps may be rearranged, substeps may be performed in parallel, shown steps may be omitted, or other steps may be included, etc.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A system comprising:
   a frame;
   a pair of rolls, the rolls including a first roll and a second roll, each of the rolls having a circumferential surface, a plurality of teeth being formed on the circumferential surface;
   at least one motor configured to rotate at least one of the rolls;
   roll supports configured to support the rolls on the frame in a manner such that at least one of the rolls is movable to adjust a separation gap between the rolls;

a detection apparatus configured to detect contact of one of the rolls with an other one of the rolls while at least one of the rolls is being rotated by the at least one motor;

a signaling apparatus configured to produce a signal when the detection apparatus detects contact between the rolls; and wherein the detection apparatus comprises a vibration sensor mounted proximate to the roll support of at least one roll of the pair of rolls such that the vibration sensor detects a change in at least one characteristic of vibration resulting from contact of the one roll with the other roll when the at least one roll is being rotated by the at least one motor; and an adjustment apparatus configured to adjust a position on the frame of a movable first roll of the pair of rolls with respect to a position on the frame of a second roll of the pair of rolls, the adjustment apparatus being configured to receive the signal from the signaling apparatus and change movement of the position of the first roll of the pair of rolls with respect to the position of the second roll of the pair of rolls.

2. The system of claim 1 wherein the vibration sensor comprises an accelerometer.

3. The system of claim 1 wherein the vibration sensor is mounted proximate to an end of the at least one roll of the pair of rolls.

4. The system of claim 1 wherein the vibration sensor is mounted on one of the roll supports supporting the at least one roll of the pair of rolls.

5. The system of claim 1 wherein the vibration sensor generates a signal corresponding to at least one characteristic of vibration of one of the rolls.

6. The system of claim 1 wherein each of the rolls has opposite ends; and wherein the detection apparatus comprises a pair of the vibration sensors, each vibration sensor of the pair of sensors being mounted proximate to a discrete said end of the at least one roll of the pair of rolls such that the vibration sensor detects vibration resulting from contact between the rolls.

7. The system of claim 1 wherein each of the roll supports includes a bearing mounting block mounted on the frame and supporting one of the opposite ends of the roll; and wherein the vibration sensor of the detection apparatus is mounted on the bearing mounting block to thereby sense vibration of the roll through the bearing mounting block supporting the roll.

8. The system of claim 1 wherein each of the roll supports includes a bearing mounting block mounted on the frame and supporting one of the opposite ends of the roll such that each of the opposite ends of the rolls of the pair of rolls is supported by a said bearing mounting block; and wherein a said vibration sensor of the detection apparatus is mounted on each of the bearing mounting blocks of the roll supports to thereby sense vibration of the roll through the bearing mounting blocks supporting the rolls.

9. A system comprising:

a frame;

a pair of rolls, the rolls including a first roll and a second roll, each of the rolls having a circumferential surface with a plurality of teeth being formed on the circumferential surface, each of the rolls being elongated with opposite ends;

at least one motor configured to rotate at least one of the rolls;

roll supports configured to support the rolls on the frame in a manner such that at least one of the rolls is movable with respect to the frame to adjust a separation gap between the rolls, the separation gap extending between the pair of rolls and having opposite gap ends with each gap end being located between adjacent ends of the rolls;

a detection apparatus configured to detect contact of one of the rolls with an other one of the rolls while at least one of the rolls is being rotated by the at least one motor;

a signaling apparatus configured to produce a signal when the detection apparatus detects contact between the rolls; and an adjustment apparatus configured to receive the signal from the signaling apparatus and change movement of one of the rolls with respect to the other of the rolls;

wherein the detection apparatus is configured to generate a beam to pass through the separation gap between the rolls at locations adjacent to each of the opposite gap ends of the separation gap such that contact between the pair of rolls that closes the separation gap at either gap end interrupts the passage of the beam.

10. The system of claim 9 wherein the detection apparatus comprises two sets of a beam generating device and a beam sensing device, a said set being located adjacent to each of the gap ends of the separation gap, the beam generating device and beam sensing device of a said set being positioned on opposite sides of the separation gap to project a beam between the devices through the separation gap.

* * * * *